(12) United States Patent
Jeon

(10) Patent No.: US 11,149,846 B2
(45) Date of Patent: Oct. 19, 2021

(54) ACTUATOR ASSEMBLY FOR A TRANSMISSION SHIFTER

(71) Applicant: Dura Operating, LLC, Auburn Hills, MI (US)

(72) Inventor: Jinseok Jeon, LaSalle (CA)

(73) Assignee: DUS Operating Inc., Auburn Hills, MI (US)

( * ) Notice: Subject to any disclaimer, the term of this patent is extended or adjusted under 35 U.S.C. 154(b) by 246 days.

(21) Appl. No.: 15/652,761

(22) Filed: Jul. 18, 2017

(65) Prior Publication Data
US 2019/0024787 A1   Jan. 24, 2019

(51) Int. Cl.
| F16H 1/20 | (2006.01) |
| F16H 57/038 | (2012.01) |
| F16H 61/32 | (2006.01) |
| F16H 61/00 | (2006.01) |
| F16H 57/02 | (2012.01) |
| F16H 61/28 | (2006.01) |

(52) U.S. Cl.
CPC ............. *F16H 61/32* (2013.01); *F16H 1/203* (2013.01); *F16H 57/038* (2013.01); *F16H 61/0006* (2013.01); *F16H 2057/02034* (2013.01); *F16H 2061/2892* (2013.01); *F16H 2061/326* (2013.01)

(58) Field of Classification Search
CPC ........ F16H 61/32; F16H 1/203; F16H 57/038; F16H 61/0006; F16H 2057/02034; F16H 2061/2892; F16H 63/3009; F16H 63/3491; F16H 2061/326
USPC .......................................................... 74/420
See application file for complete search history.

(56) References Cited

U.S. PATENT DOCUMENTS

| 112,251 | A | * | 2/1871 | Huntoon | ................. F16H 1/203 |
| | | | | | 74/420 |
| 121,932 | A | * | 12/1871 | Deering | .................. F16H 1/203 |
| | | | | | 74/420 |
| 3,073,176 | A | | 1/1963 | Daugirdas | |
| 3,798,991 | A | * | 3/1974 | Kime | ...................... B01F 15/00 |
| | | | | | 74/417 |
| 4,065,983 | A | | 1/1978 | Mimura | |
| 4,463,628 | A | | 8/1984 | Ahlschwede et al. | |

(Continued)

FOREIGN PATENT DOCUMENTS

| DE | 10232426 A1 | 2/2003 |
| DE | 102011082828 A1 | 3/2013 |

(Continued)

OTHER PUBLICATIONS

EP Extended Search Report for EP Application No. 18178945.4 dated Nov. 12, 2018 (7 pages).

(Continued)

*Primary Examiner* — Jake Cook
*Assistant Examiner* — Gregory Robert Weber

(57) ABSTRACT

In at least some implementations, a gear shift actuator assembly to cause gear changes in a vehicle transmission includes an electrically operated drive member, a drivetrain driven by the drive member and having a plurality of gears arranged in a plurality of stages to provide a torque increase and a direction change within the drivetrain and an output driven by the drivetrain for rotation to cause a gear change in the vehicle transmission. In some implementations, the torque increase from the motor to the output is between 150:1 and 300:1.

22 Claims, 7 Drawing Sheets

(56) References Cited

U.S. PATENT DOCUMENTS

| | | | |
|---|---|---|---|
| 5,680,793 A * | 10/1997 | Flamang | F16H 1/20 |
| | | | 74/325 |
| 5,937,507 A | 8/1999 | Asakura et al. | |
| 6,550,351 B1 | 4/2003 | O'Reilly et al. | |
| 6,918,314 B2 | 7/2005 | Wang | |
| 7,140,932 B2 * | 11/2006 | Mizuguchi | B63H 20/00 |
| | | | 440/75 |
| 7,354,372 B2 | 4/2008 | Wang | |
| 7,845,249 B2 | 12/2010 | Jayaram et al. | |
| 8,256,313 B2 | 9/2012 | Ganter | |
| 8,936,524 B2 | 1/2015 | Howe et al. | |
| 9,114,798 B1 * | 8/2015 | Fox | B60W 10/08 |
| 9,334,949 B2 | 5/2016 | Fett et al. | |
| 9,394,991 B2 | 7/2016 | Swaita et al. | |
| 9,644,704 B2 | 5/2017 | Weber et al. | |
| 9,726,281 B2 | 8/2017 | Kurita et al. | |
| 9,964,204 B2 | 5/2018 | Redwood et al. | |
| 9,970,543 B2 | 5/2018 | Jeon et al. | |
| 2006/0053921 A1 | 3/2006 | Kawamura et al. | |
| 2009/0107274 A1 | 4/2009 | Fukushima et al. | |
| 2011/0126657 A1 | 6/2011 | Ganter et al. | |
| 2011/0239798 A1 | 10/2011 | Ramirez, Jr. et al. | |
| 2011/0265594 A1 | 11/2011 | Ramirez, Jr. et al. | |
| 2014/0274529 A1 | 9/2014 | Edler et al. | |
| 2014/0373664 A1 | 12/2014 | Takano et al. | |
| 2015/0075311 A1 | 3/2015 | Kanzaki | |
| 2015/0143938 A1 * | 5/2015 | Swaita | F16H 61/22 |
| | | | 74/473.12 |
| 2015/0285373 A1 | 10/2015 | Nagahori et al. | |
| 2015/0337957 A1 * | 11/2015 | Cyren | F16H 61/32 |
| | | | 74/473.12 |
| 2016/0215863 A1 | 7/2016 | Cao et al. | |
| 2017/0175885 A1 | 6/2017 | Jeon et al. | |
| 2017/0180177 A1 | 6/2017 | Wu et al. | |
| 2017/0248196 A1 * | 8/2017 | Turner | F02N 11/0851 |
| 2018/0062479 A1 | 3/2018 | Stewart et al. | |
| 2018/0119754 A1 | 5/2018 | Teillet | |
| 2018/0156332 A1 | 6/2018 | Kimes et al. | |
| 2018/0172120 A1 | 6/2018 | Kouno et al. | |
| 2018/0195603 A1 | 7/2018 | Gonzalez | |
| 2018/0202526 A1 | 7/2018 | Wang | |
| 2018/0216712 A1 | 8/2018 | Forrester, Jr. et al. | |
| 2018/0266530 A1 | 9/2018 | Alfano et al. | |

FOREIGN PATENT DOCUMENTS

| | | |
|---|---|---|
| DE | 102015208496 A1 | 5/2016 |
| EP | 0091083 A2 | 10/1983 |
| EP | 1503108 A2 | 2/2005 |
| EP | 2926036 A1 | 10/2015 |
| EP | 3181957 A1 | 6/2017 |
| GB | 2468214 A | 9/2010 |
| JP | 2009052748 A | 3/2009 |
| KR | 100649940 B1 | 11/2006 |
| KR | 100893031 B1 | 4/2009 |
| KR | 20180076502 A * | 7/2018 |
| WO | WO2014082676 A1 | 6/2014 |

OTHER PUBLICATIONS

EP Extended Search Report for EP Application No. 18178962.9 dated Nov. 12, 2018 (7 pages).
EP Extended Search Report for EP Application No. 18178981.9 dated Nov. 14, 2018 (6 pages).
EP Extended Search Report for EP Application No. 18179307.6 dated Nov. 22, 2018 (7 pages).
EP Extended Search Report for EP Application No. 18178922.3 dated Dec. 20, 2018 (13 pages).

* cited by examiner

US 11,149,846 B2

ACTUATOR ASSEMBLY FOR A TRANSMISSION SHIFTER

TECHNICAL FIELD

The present disclosure relates generally to an actuator assembly for a gear shift system of a vehicle transmission.

BACKGROUND

In some vehicles, a gear shift lever in a passenger compartment of the vehicle can be moved by an operator of the vehicle to shift the vehicle transmission between its park gear and other gears, such as reverse, neutral and forward drive gears. The shift lever is mechanically coupled to the transmission through a cable that transmits the shift lever movement to a transmission shift mechanism. Other vehicles use a so-called "shift-by-wire" system wherein an operator shift lever or shift control unit is not physically coupled to the transmission shift mechanism by a cable. Instead, the shift control unit is electrically coupled to a shift actuator that is arranged to shift the transmission upon receipt of a signal from the shift control unit that a transmission gear shift is desired by the operator. If electrical power is lost to the vehicle, or to the electrical circuit of the vehicle from which electricity is supplied to the shift-by-wire system, then the ability of the operator to control shifting of the transmission via the shift control unit is also lost.

Further, the space in which the shift control unit is located is often adjacent to the transmission and in a confined space such that larger units cannot be located where desired and links, cables or other connecting members are needed between the shift control unit and the transmission shift lever.

SUMMARY

In at least some implementations, a gear shift actuator assembly to cause gear changes in a vehicle transmission includes an electrically operated drive member, a drivetrain driven by the drive member and having a plurality of gears arranged in a plurality of stages to provide a torque increase and a direction change within the drivetrain and an output driven by the drivetrain for rotation to cause a gear change in the vehicle transmission. In some implementations, the torque increase from the motor to the output is between 150:1 and 300:1.

A first portion of the drivetrain may be between the motor and a second portion of the drivetrain that includes the direction change, and the first portion of the drivetrain may provide a torque increase of at least 2:1 and in some examples at least 5:1. The second portion of the drivetrain may provide a torque increase of at least 2:1 and in some examples at least 5:1. The second portion of the drivetrain may be coupled to a third portion of the drivetrain that is between the second portion of the drivetrain and the output, and the third portion of the drivetrain may provide a torque increase of at least 2:1.

In at least some implementations, the direction change is provided by one gear that rotates about a first axis and another gear that rotates about a second axis that is not parallel to the first axis, and the other gear is meshed with the one gear. The one gear and the other gear may be one of the following types of gears: bevel, face, crown or hypoid. The first axis and second axis may be perpendicular to each other, the output may rotate about an axis parallel to the second axis, and the other gear and the output may be coaxial. The actuator assembly may also include a mounting frame to which at least some of the drivetrain gears are coupled, and the mounting frame may have a wall with a first side and a second side opposite to the first side, and the output may be on the first side of the wall and the other gear may be on the second side of the wall.

In at least some implementations, the drive member includes a drive shaft and a motor that rotates the drive shaft, and the drivetrain includes a drive gear coupled to the drive shaft wherein the drive gear is a spur gear. The drive gear may be rotated about a first axis and a first gear may be meshed with and driven by the drive gear for rotation about a second axis offset from and parallel to the first axis, and a second gear may be meshed with and driven by the first gear. The second gear may be located within the axial extent of the drive member measured along the first axis. In at least some implementations, the gears of the drivetrain may be driven in opposite directions.

In at least some implementations, a gear shift actuator assembly to cause gear changes in a vehicle transmission includes an electric motor having a drive shaft driven by the motor for rotation about a first axis, a drivetrain and an output driven by the drivetrain for rotation to cause a gear change in the vehicle transmission. The drivetrain may include a drive gear mounted on and driven by the drive shaft for rotation about the first axis, where the drive gear is a spur gear, and where the drivetrain also includes a plurality of gears that are rotated as the drive gear rotates. The plurality of gears may be arranged in a plurality of stages to provide a torque increase within the drivetrain.

In at least some implementations, at least two of the gears in the drivetrain are meshed together and rotate about axes that are not parallel. The gears that rotate about axes that are not parallel may be of one of the following types of gears: bevel, face, crown or hypoid. In at least some implementations, at least one stage of gears is located between the drive gear and the gears that rotate about axes that are not parallel, and the at least one stage of gears provides a torque increase of at least 5:1.

BRIEF DESCRIPTION OF THE DRAWINGS

The following detailed description of representative implementations and best mode will be set forth with regard to the accompanying drawings, in which.

DETAILED DESCRIPTION

Referring in more detail to the drawings, FIGS. 1-6 show a shift actuator assembly 10 that is commanded by a driver-operated shift mechanism to cause a gear shift of a transmission, for example to shift the transmission among and between park, neutral, reverse and forward drive gears. The shift actuator assembly 10 may be part of a so-called "shift by wire" system where an operator command for a gear shift (e.g. by turning a rotary shifting knob or moving a lever or other gear shifter) is transmitted to a main drive member 16 of the assembly which drives an output mechanism 18 that is coupled to a transmission shift lever (diagrammatically shown at 14 in FIG. 4) to shift among the transmission gears. The actuator assembly 10 can also be used in other vehicle systems wherein a rotary or linear output is needed, for example a park-lock system, valve controller or a locking mechanism.

Figure 12:
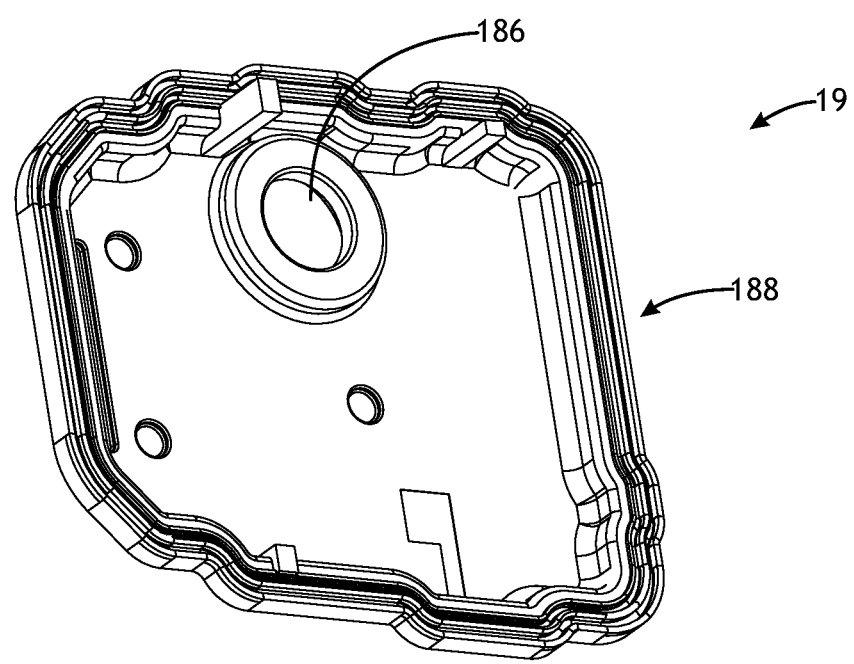
FIG. 12 is a perspective view of the inside of a upper portion of a housing for the actuator assembly.
Figure 13:
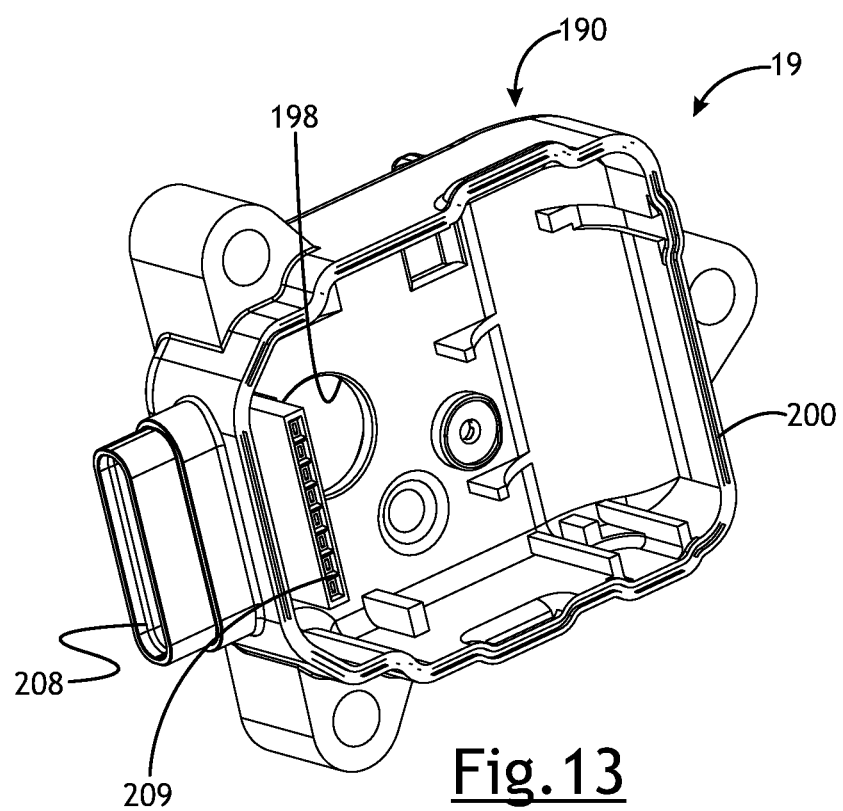
FIG. 13 is a perspective view of the inside of a lower portion of the housing.

In FIGS. 1-6, the actuator assembly 10 is shown without an outer housing surrounding the components of the assembly, but such an outer housing 19 may be provided if desired and one example is shown in FIGS. 12 and 13. The actuator assembly 10 may be mounted directly on a transmission or may be located spaced from the transmission and connected to a shift mechanism of the transmission by a cable or other intermediate member, if desired. In at least some implementations, the actuator assembly 10 is compact and relatively small in size and may be received between a shift lever actuated by the vehicle driver and the transmission, within a transmission tunnel defined between the transmission and adjacent interior vehicle surfaces, or elsewhere as desired.

The main drive member 16 may be any device capable of causing a shift of the transmission in response to an operator of the vehicle's request. In the example shown in the drawings, the main drive member includes an electric motor 20 and may also include a controller communicated with the motor to control the operation of the motor. The controller may be or include a microprocessor 22 (diagrammatically shown in FIGS. 2 and 6) with suitable memory be electrically communicated with the driver operated shifter to cause the motor 20 to drive the output 18 in response to a driver initiated gear shift. The drive member 16 is coupled to the output 18 by a drivetrain 24. The drivetrain 24 may be any device or devices that interface with the main drive member 16 and the output 18 to facilitate shifting the transmission. In at least one implementation, the drivetrain 24 includes a plurality of gears that provide a mechanical advantage that amplifies the torque of the motor 20 to facilitate a gear shift. In this way, a smaller and less expensive motor 20 may be used while still providing a necessary magnitude of torque to the output 18.

Figure 6:
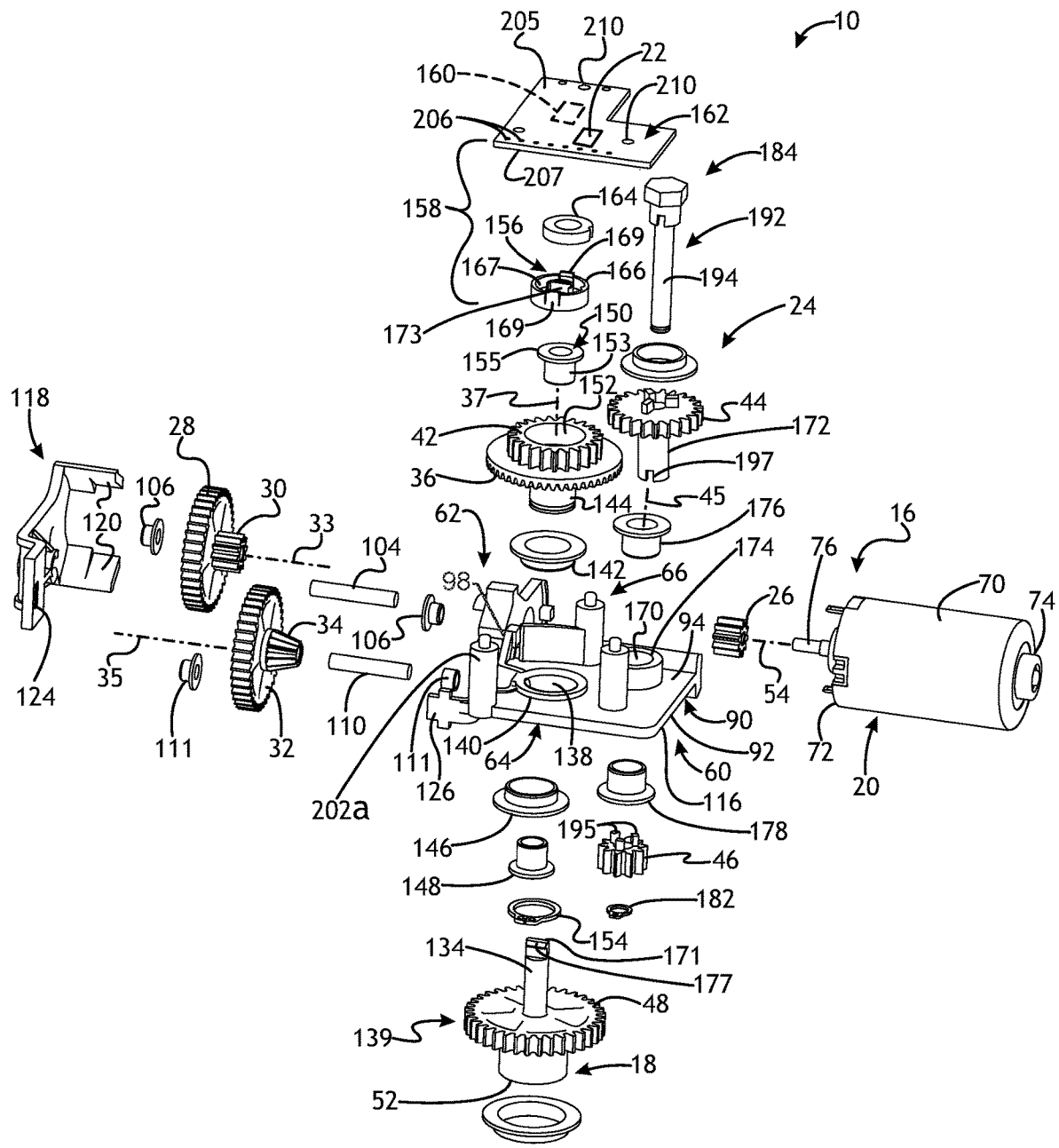
FIG. 6 is an exploded perspective view of the assembly.

In the implementation shown, the drivetrain 24 includes a first stage that has a drive gear 26 that is directly driven by the motor 20 and a first gear 28 that is meshed with and driven by the drive gear. A second stage of the drivetrain includes a second gear 30 and a third gear 32. The second gear 30 is coaxial with and coupled to the first gear 28 to rotate with the first gear about a common axis 33 (FIG. 6). The third gear 32 is meshed with and driven by the second gear 30 about an axis 35 that is parallel to but laterally offset from the axis 33 of the first and second gears. The first gear 28 has more teeth than the drive gear 26 providing a first torque increase which may increase the torque provided by the motor by, for example, between two to ten times. The first gear 28 also has more teeth than the second gear 30. The third gear 32 has more teeth than the second gear 30 providing a second torque increase which may further increase the torque by, for example, between two to ten times. Although not required, in the implementation shown, the first and third gears 28, 32 have the same number of teeth and are of the same size (e.g. outer diameter).

A third stage of the drivetrain includes a fourth gear 34 and a fifth gear 36. The fourth gear 34 has fewer teeth than the third gear 32 and is coaxial with and fixed to the third gear to rotate with the third gear about the common axis 35. The fourth gear 34 is meshed with and drives the fifth gear 36. In this implementation, the fourth and fifth gears 34, 36 rotate about axes that are not parallel to each other—the axes are perpendicular to each other in the illustrated implementation—which provides a first direction change in the drivetrain. As shown, the fourth and fifth gears 34, 36 are bevel gears and the fourth gear 34 rotates about the axis 35 and the fifth gear 36 rotates about an axis 37 perpendicular to the axis 33 of the third and fourth gears 32, 34. As shown, the fourth and fifth gears 34, 36 are bevel gears and the fourth gear 34 has fewer teeth than the fifth gear 36, providing a third torque increase in the drivetrain which may increase the torque by, for example, between 2 and 10 times. The fourth and fifth gears 34, 36 could be other types of gears that permit a direction change, such as but not limited to, hypoid, face or crown gears.

A fourth stage of the drivetrain 24 may include a sixth gear 42 and a seventh gear 44. The sixth gear 42 is coaxial with and fixed to the fifth gear 36 for rotation with the fifth gear about the axis 37. The sixth gear 42 is meshed with and drives the seventh gear 44 about an axis 45 that is parallel to but laterally offset from the axis 37 of the fifth and sixth gears 36, 42. In this implementation, the sixth and seventh gears 42, 44 have a like number of teeth so there is no torque increase provided by the fourth stage of the drivetrain 24, but there could be if desired.

A fifth stage of the drivetrain 24 may include an eighth gear 46 and a ninth gear 48. The eighth gear 46 is coaxial with the seventh gear 44 for rotation with the seventh gear about the axis 45. The eighth gear 46 is meshed with and drives the ninth gear 48 which, in this implementation, is directly coupled to the output 18 so that the output rotates about the axis 37 that is parallel to but laterally offset from the axis 45 of the seventh and eighth gears 44, 46. The output 18 may include a coupling feature 50 so that the output may be directly or indirectly coupled to the transmission shift mechanism. In the example shown, the coupling feature 50 includes a cavity formed in an outer end 52 of the output with internal splines or teeth arranged to engage and drive a mating component. Rotation of the output 18 causes a transmission shift change. The eighth gear 46 has fewer teeth than the ninth gear 48 providing a fourth torque increase in the drivetrain 24 which may increase the torque by a factor of, for example, 2 to 10.

Accordingly, the drivetrain 24 includes multiple gears in multiple stages. At least one stage provides a torque increase and at least one stage provides a direction change. In the example shown, the direction change is downstream of one or more stages that provide a torque increase and upstream of one or more stages that provide a torque increase. The torque increase, as noted above, permits use of a smaller and less expensive motor 20 while still providing a desired torque or force to the output 18 to cause transmission gear shifts. In at least some implementations, the drivetrain may provide a total torque increase by a factor of equal to or greater than 100 and less than 400, such that the torque at the output 18 is 100 times or more greater than the output torque of the motor 20.

The direction change permits multiple gear stages to be arranged in a relatively small area, and also permits an axis 54 (FIGS. 1 and 6) of the motor 20 to be perpendicular to the rotational axis 37 of the output 18. Hence, the motor 20, which is typically longer along its axis 54 than it is wide (where the diameter is the width) can be laid flat with the motor axis 54 perpendicular to the output axis 37 to further reduce the overall size of the actuator assembly 10. More than one stage can include or provide a direction change, as desired. Further, the gears may be of any type and most are shown as simple spur gears in the illustrated example, each having teeth extending radially outwardly from the main body of the gear.

To facilitate assembly and retaining the various components, the actuator assembly 10 may include a mounting frame 60 that retains and carries at least part of the drivetrain 24 and may also retain or position the motor 20 relative to the drivetrain. In the implementation shown, the mounting frame 60 includes a drive member (e.g. motor) locating or supporting portion 62, a drivetrain supporting portion 64 and an electronics supporting portion 66 as labelled in FIGS. 6 and 9-11.

The motor locating or supporting portion 62 may include a bracket 68 that may be integral with the mounting frame 60 (i.e. formed from the same piece of material as the remainder of the mounting frame) or separate from and coupled to the mounting frame. The drive member 16 may include the motor 20 enclosed within a cylindrical casing 70 having first and second ends 72, 74 (FIGS. 1, 2 and 6) that are generally perpendicular to the motor axis 54. The drive member 16 may also include a drive shaft 76 (FIGS. 5 and 6) that is driven for rotation by the motor 20 and which extends out of the first end 72 of the casing 70. The bracket 68 includes a first laterally extending wall 78 that overlies at least part of the first end 72 of the motor casing 70 and the first lateral wall 78 has an opening 80 through which the drive shaft 76 extends. In assembly, the drive gear 26 is mounted to the drive shaft 76 on the opposite side of the lateral wall 78 as the motor casing 70. The motor supporting section 62 may further include a second lateral wall 82 adapted to overlie at least part of the second end 74 of the casing 70 that is axially opposite to the first end 72. Hence, the motor 20 may be supported or its position maintained between two lateral walls 78, 82 of the mounting frame 60.

The first lateral wall 78 may include an axially extending flange 84 adapted to axially overlap part of the casing 70 to inhibit radial movement of the motor casing 70 relative to the mounting frame 60. To inhibit or prevent rotation of the motor 20 relative to the mounting frame 60, the frame may include one or more tabs 85 that may be received in a cavity or slot in the casing 70. Between the lateral walls 78, 82, the mounting frame 60 may include an axially extending surface 86 that is arcuate and complementary in shape to the outer surface of the casing 70 and arranged to engage or closely overlap a portion of the casing to help locate and retain the motor 20 relative to the mounting frame 60. Hence, the motor supporting portion 62 of the mounting frame 60 may axially and radially engage the motor casing 70 to locate and/or retain or supported the motor. This properly locates the motor 20 and its drive shaft 76, as well as the drive gear 26 mounted on the drive shaft, relative to the drivetrain 24 so that the motor 20 may drive the output 18 and cause a gear shift when commanded to do so.

The mounting frame 60 may also include a drivetrain retaining portion 64 which may be proximal and adjacent to the motor supporting portion 62 to facilitate meshed engagement of the drive gear 26 with the remainder of the drivetrain 24. The drivetrain supporting portion 64 may be defined by a main wall 90 of the mounting frame 60. The main wall 90 may have a first side 92 facing the output 18 and an opposite second side 94 that faces away from the output 18. The first and second sides 92, 94 may be arranged generally perpendicular to the axis 37 of the output 18 and generally parallel to the motor axis 54. Further, the main wall 90 may be aligned with the axis 54 of the motor 20 such that if the first and second sides 92, 94 of the main wall 90 were extended in the direction of the motor 20, the motor axis 54 would be between the extended first and second sides. Hence, the motor axis 20 is aligned with a first side edge of the main wall 90 which may include the surface 86.

Figure 11:
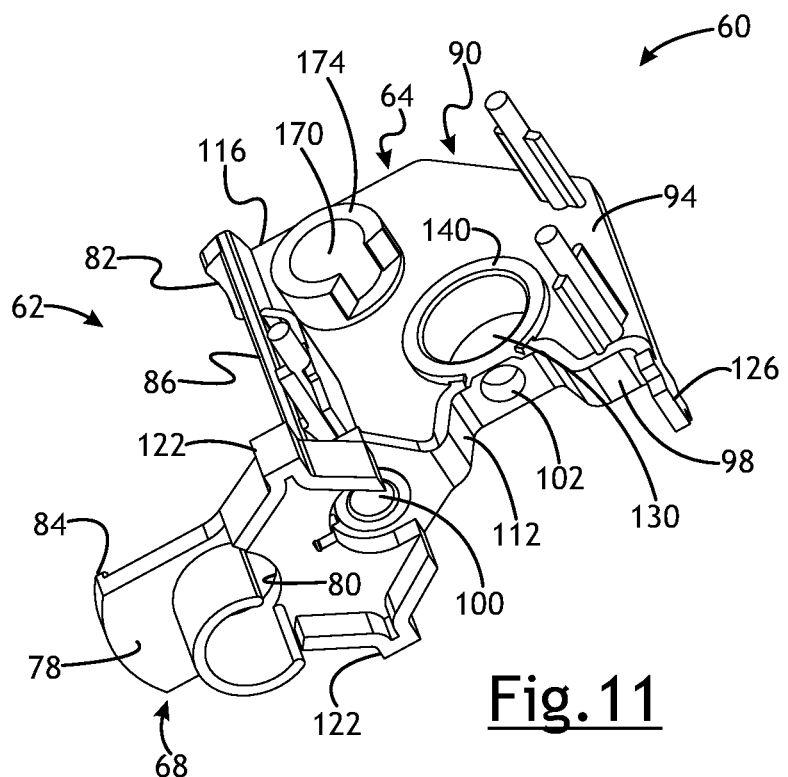
FIG. 11 is a perspective side view of the mounting frame.

A second side edge 98 of the main wall 90 may be adjacent to the first side edge 96 and to the drive gear 26. The second side edge 98 may include one or more features to mount one or more of the gears to the mounting frame 60, including, for example the first gear 28 that is meshed with and driven by the drive gear 26. In the illustrated example, the mounting frame 60 includes one or more bores formed in the second side edge 98 of the main wall. As shown in FIGS. 6 and 11, two bores 100, 102 are provided and the first bore 100 receives a pin 104 (FIG. 6) about which the first gear 28 and second gear 30 rotate. Suitable bearings 106 may be provided between the pin 104 and the first gear 28, and between the second gear 30 and the second edge 98 of the main wall 90 to facilitate rotation of the gears 28, 30 with less friction and to maintain the axis 33 of the gears 28, 30 parallel to the motor axis 54 and drive gear 26. The second bore 102 may receive another pin 110 about which the third and fourth gears 32, 34 rotate with bearings 111 provided.

As shown, the drive gear 26 is aligned with the first gear 28 which is located outboard of the second gear 30 (i.e. the first gear is farther from the second edge 98 than the second gear). The second gear 30 is aligned and meshed with the third gear 32 and the third gear is outboard of the fourth gear 34. Hence, in this example, the second gear is within the axial extent of the motor 20 and drive shaft 76 (where the axial extent is the length measured along the motor axis 54) and the fourth gear 34 is closest to the second edge 98 of the main wall 90. To reduce the overall size of the drivetrain 24, the second edge 98 may include a recess 112 in which at last part of a gear (e.g. the fourth gear 34) is received thereby reducing the distance the fourth gear 34 is from a centerline 114 (FIG. 10) of the main wall 90 that is perpendicular to the main wall. In at least some implementations, the drive gear 26 is the axially outermost gear and the other gears of the drivetrain 24 are located aligned with or axially between the drive gear 26 and either the second end 74 of the casing 70 or a third side edge 116 of the main wall 90.

To retain the first, second, third and fourth gears 28-34 relative to the mounting frame 60, a gear retainer 118 (FIGS. 1-3, 5 and 6) may be coupled to the mounting frame. In this regard, the mounting frame 60 may include one or more coupling features and the gear retainer 118 may include mating or complementary coupling features. The coupling features may provide a snap-fit, friction fit or otherwise connect the gear retainer 118 to the mounting frame 60 without separate fasteners (like a screw), but separate fasteners could be used if desired. Also, the gear retainer 118 can be bonded, adhered welded or otherwise fixed to the mounting frame 60, if desired. In the illustrated example, the coupling features includes a pair of fingers 120 that extend from the gear retainer 118 and are received against spaced apart surfaces 122 (FIGS. 9-11) of the mounting frame 60, and a slot 124 in the gear retainer 118 that receives a finger 126 that extends from the area of the second side edge 98 of the main wall 90. The gear retainer 118 may include openings 128, 130 (FIGS. 1 and 5) coaxially aligned with the bores 100, 102 in the main wall 90 to receive part of the bearings 106, 111 for the pins 104, 110 and the pins may likewise extend at least partially into the openings 128, 130. In this way, the pins 104, 110 are supported at one end by the main wall 90 and at their other end by the gear retainer 118. Hence, gear retainer 118 overlies and defines part of a pocket 132 (FIGS. 2 and 3) or cavity with the main wall 90. The first and second stages of the drivetrain 24 are supported between and retained by the main wall 90 and the gear retainer 118 within the pocket 132.

To engage and be driven by the fourth gear 34, the fifth gear 36 may overlie the recess 112 and part of the second edge 98 of the main wall 90. The fifth gear 36 (and hence, sixth gear 42) may rotate about a pin 134 that is not parallel to the pin 110 or axis of rotation 35 of the fourth gear 34, providing a direction change in the drivetrain 24, as noted above. In the implementation shown, the pin 134 and axis of rotation 37 of the fifth and sixth gears 36, 42 are perpendicular to the axis of rotation 33 of the second gear 30. To mount the fifth and sixth gears 36, 42 on the drivetrain supporting portion 64, the main wall 90 includes an opening 138 through which the pin 134 extends. The opening 138 is laterally offset from the recess 112, extends through both sides 92, 94 of the main wall 90, and the axis of the pin 110 for the third and fourth gears 32, 34 intersects an axis of the opening 138 (e.g. axis 37 in the illustrated embodiment). For further space savings, the pin 134 may be integral with the body 139 (FIGS. 6 and 8) defining the output 18 and ninth gear 48. Accordingly, the pin 134 may extend axially in the opposite direction as the output 18, and the fifth and sixth gears 36, 42 may be coaxial with but arranged on the opposite side of the main wall 90 as the output 18 and ninth gears 48.

To facilitate location of the fifth and sixth gears 36, 42 relative to the main wall 90 and to the fourth gear 34, an annular collar 140 is provided that extends axially from the side 94 of the main wall. As shown in FIG. 6, a bearing 142 may be received between the collar 140 and fifth gear 36, and around a cylindrical and hollow shaft 144 extending from the body that includes the fifth and sixth gears 36, 42. A similar bearing 146 may be received within the opening 138 from the opposite side 92 of the main wall 90 to further journal the shaft 144 for rotation relative to the main wall. The pin 134 may extend into the hollow shaft 144 and/or an opening formed in or through the body defining the fifth and sixth gears, and a further bearing 148 may be received between the pin 134 and the shaft 144, that is, around the exterior of the pin and inside of the shaft to permit the pin (and ninth gear 48 and output 18) to rotate relative to the shaft (and fifth and sixth gears 36, 42). A second bearing 150 for the pin 134 may be received in a cavity 152 in the sixth gear 42. The second bearing 150 may have a cylindrical or tubular portion 153 received between the pin 134 and shaft 144, and a radially outwardly extending portion 155 that overlies a bottom or end surface of the cavity 152. Thus, the pin 134 and shaft 144 are coaxially aligned but rotate relative to each other so that the coaxially aligned sixth and ninth gears rotate relative to each other. A retainer 154 may be coupled to the shaft 144 on an opposite side 92 of the wall 90 as the fifth gear 36, to hold the fifth and sixth gears 36, 42 relative to the main wall. Similarly, a retainer 156 may be coupled to the pin 134 on the opposite side 94 of the wall 90 as the ninth gear 48 to hold the output 18 and integral ninth gear 48 relative to the main wall 90.

Figure 8:
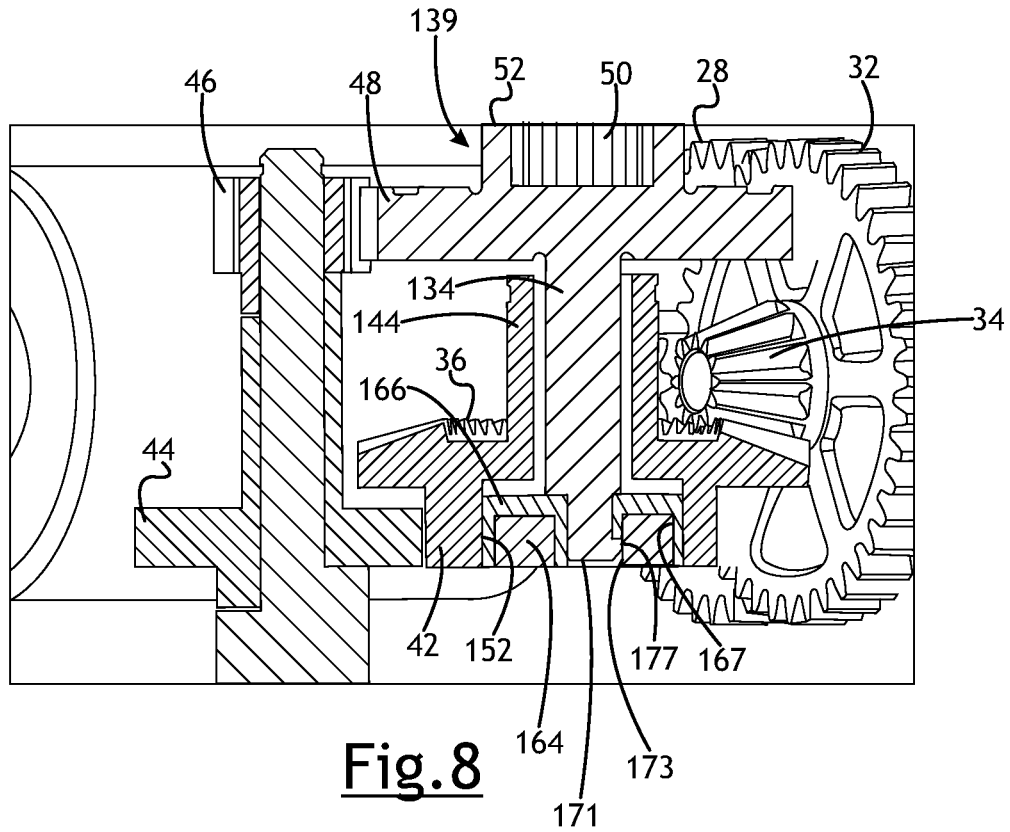
FIG. 8 is a fragmentary sectional view of the drivetrain.
Figure 9:
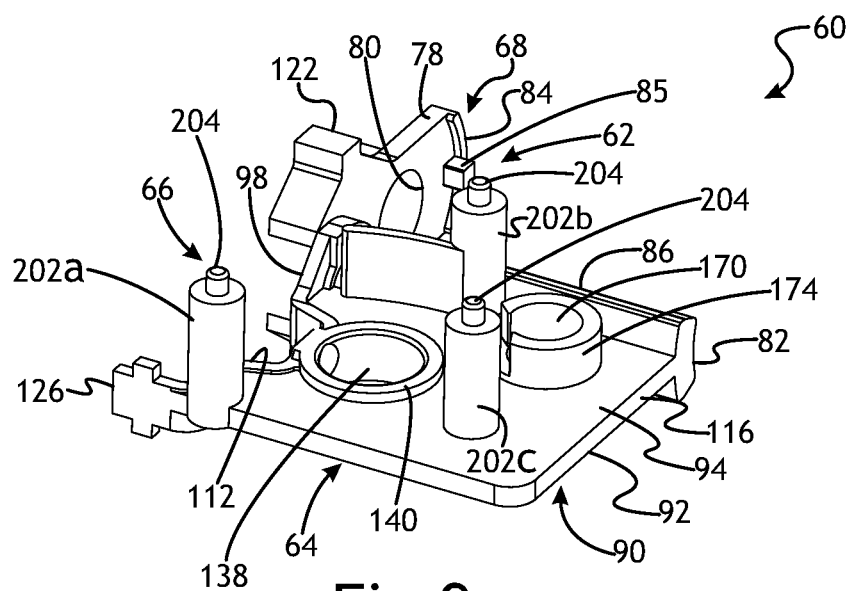
FIG. 9 is a perspective top view of the mounting frame.
Figure 10:
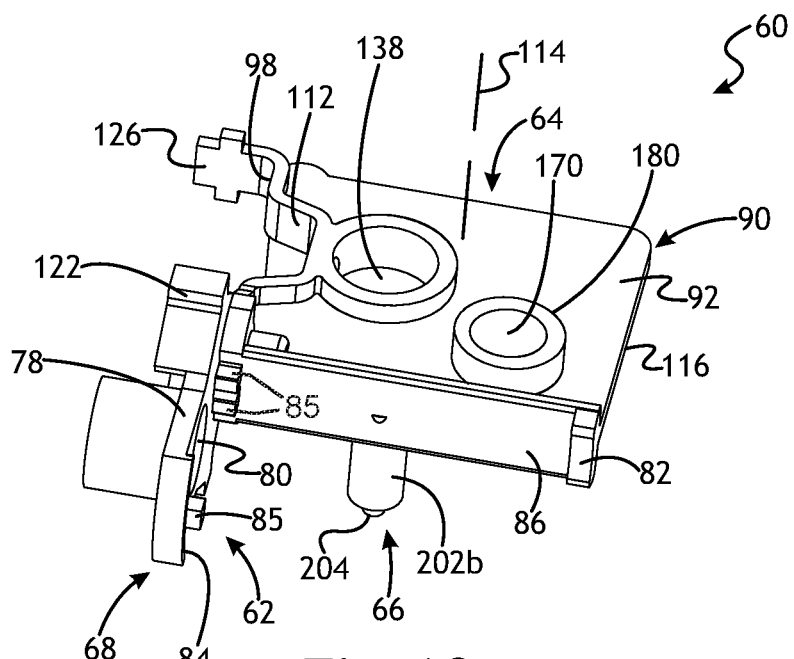
FIG. 10 is a perspective bottom view of the mounting frame.

The output retainer 156 may be part of a rotary position sensing mechanism 158 used to determine the rotary position of the output 18. In this regard, the implementations shown includes a magnetic sensor 160 on a circuit board 162, and a magnet 164 retained in a carrier 166 (which may integrally include the retainer 156 as set forth below). As shown in FIGS. 6 and 8, the magnet 164 may be annular, and the carrier 166 may have an annular or generally annular cavity 167 in which the magnet is received. The carrier 166 may include one or more flexible and resilient tabs 169 that partially overly the cavity 167. When the magnet 164 is pressed into the cavity 167, the magnet engages the tabs 169 and flexes the tabs outwardly from the cavity and then the tabs return to an unflexed position after the magnet is in the cavity so that a portion of each tab overlies the magnet and retains the magnet within the carrier 166.

The carrier 166 is coupled to the end of the pin 134 and, relative to the output 18, is at the axially opposed end of the body that defines the pin 134, ninth gear 48 and output 18. The carrier 166 may be coupled to the pin 134 by any suitable means to enable the carrier and pin to co-rotate, such as a clip, fastener, weld, bond, interference fit or otherwise. In the example shown, the carrier 166 is coupled to the pin 134 by a snap-fit between a non-circular end 171 of the pin 134 and a non-circular opening 173 of the carrier 166, where a barb 177 on the pin may pass through the opening 173 of the carrier and partially overlap the carrier after passing through the opening to retain the carrier on the pin. So connected, the carrier 166 and ninth gear 48 and output 18 rotate together. Hence, as the output 18 rotates, the carrier 166 and magnet 164 are rotated relative to the sensor 160 which can detect such movement of the magnet. The rotary position of the output 18 can be correlated to the transmission gears to control accurately shifting among the transmission gears. Of course, other rotary position sensors may be used, including but not limited to a contact type sensor (e.g. a potentiometer), and an optical sensor.

In addition to being coupled to the pin 134, the carrier 166 may be received in the recess 152 formed in the body that defines the fifth and sixth gears 36, 42 which are coaxial with the ninth gear 48 and output 18, but which do not rotate with the ninth gear and output. The carrier 166 and magnet 164 may be fully received within the recess 152 such that the carrier and/or magnet is flush with an outer face of the sixth gear 42 or countersunk in the recess. The recess 152 may face in the opposite direction that the end of the output faces, and the magnet 164 is located adjacent to an opposite side of the drivetrain and actuator assembly as is the output 18. This enables the sensor 160 and related circuitry and controller to be located spaced from the output 18 and transmission, as will be set forth below. Further, the dimension of the actuator assembly 10 that is parallel to the output axis 37 is minimized by positioning the carrier 166 and magnet 164 within the sixth gear 42 rather than outboard from the sixth gear.

As noted above, the seventh gear 44 is meshed with and driven by the sixth gear 42. Accordingly, the axis 45 of the seventh gear 44 is laterally offset from the axis 37 of the sixth gear 42. To support and locate the seventh gear 44, the main wall 90 includes a second opening 170 that extends through the main wall. The second opening 170 may be laterally spaced from and parallel to the first opening 138. The seventh gear 44 may include an integral pin or shaft 172 that is received in and through the second opening 170. To axially space the seventh gear 44 from the main wall 90 and so that it is laterally aligned with and can mesh with the sixth gear 42, a collar 174 may be provided at least partially around the second opening 170, and a bearing 176 may be received between the collar 174 and the seventh gear 44. A second bearing 178 may be received in the opposite side of the second opening 170 to also journal for rotation the pin or shaft 172 of the seventh gear 44.

The eighth gear 46 may be coupled to the end of the shaft 172 and is on the opposite side of the main wall 90 as the seventh gear 44, and the same side as the mating ninth gear 48 and output 18. The bearing 178 may be received in part between a flange or collar 180 on the side 92 of the main wall 90 that axially spaces the eighth gear 46 from the main wall 90 and aligns it with the ninth gear 48.

In the implementation shown, the seventh gear 44 includes or is associated with a drive feature 184 adapted to be engaged by a tool to permit the drivetrain to be rotated by a tool coupled to the seventh gear 44. The drive feature 184 may extend through an opening 186 in the housing 19, specifically in a cover 188 of the housing as shown in FIG. 12, so that it is engageable without having to remove the cover 188 from a base 190 (FIG. 13) of the housing. It may be desirable to rotate the drivetrain gears and cause a transmission shift without use of the motor 20 in certain circumstances, such as when power is lost to the motor or if the motor fails. In one example, when the transmission is in park when power is lost or the motor 20 fails, it may be desirable to shift the transmission into neutral to facilitate towing the vehicle. If the vehicle is in forward or reverse during a system failure, it may be desirable to shift the transmission into park to inhibit movement of the vehicle.

This rotation of the drivetrain occurs against the resistance to rotation of the motor 20, the resistance to movement of the transmission shift mechanism and friction and other gear inefficiencies. While the motor resistance to rotation is typically low, for example 0.1 Nm, and the other inefficiencies can be low, the drivetrain 24 may include significant torque increase among the various gear stages that amplifies the force needed to rotate the motor 20 via the drive feature 184. Accordingly, in this example, the drive feature 184 is located between the first and last gear stages so that the total torque amplification of the drivetrain 24 is not experienced at the drive feature and the force needed to turn the drive feature and seventh gear 44 is within reasonable limits. In at least some implementations, the force is below 6 Nm so that the drive feature 184 can be turned manually with a tool (e.g. a screwdriver or wrench) and a powered tool is not needed.

Figure 7:
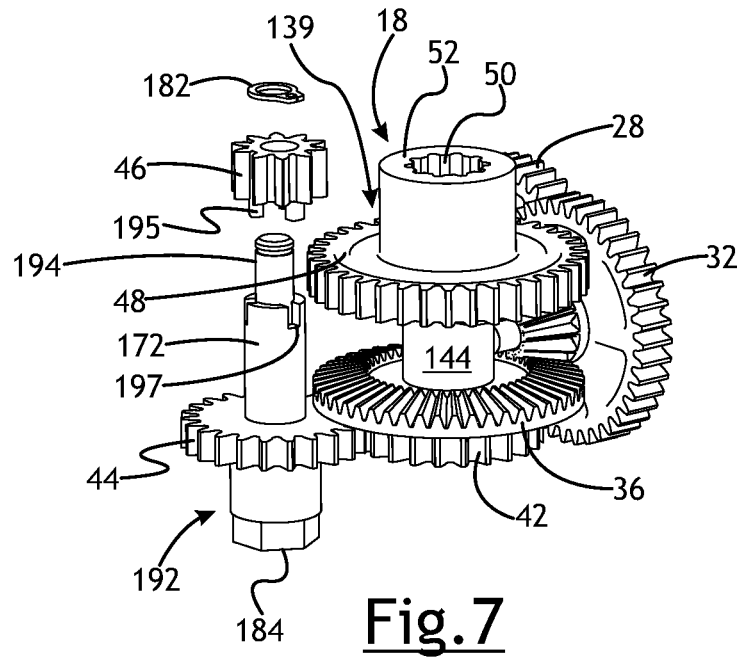
FIG. 7 is a partially exploded perspective view of the drivetrain.

In the example shown, the drive feature 184 is part of a body 192 that includes a pin 194 which extends through the shaft 172 of the seventh gear 44. And the eighth gear 46 is coupled to the pin 194 and shaft 172 for co-rotation of these components and the seventh and eighth gears 44, 46. In the example shown, the eighth gear 46 includes tabs 195 (FIGS. 6 and 7) that are received in slots 197 of the shaft 172 so that they rotate together. In other implementations, the drive feature 184 may be integrally formed on the seventh gear 44 so that the gear teeth, shaft 172 and drive feature 184 are all part of the same body and same piece of material. A separate shaft and pin would not be needed and a single pin may be used to which the eighth gear 46 may be attached. Finally, a retaining clip 182 may be installed onto the pin 194 after the eighth gear 46 is installed. This clip 182 retains both the seventh and eighth gears 44, 46 on the mounting frame 60.

Thus, the mounting frame 60 may include a plurality of gear supporting or mounting features such as openings 100, 102, 138, 170 that receive pins about or on which the various gears rotate. The drivetrain supporting portion 64 may extend outwardly beyond the gears to space the gears from the housing 19 when assembled into the housing. A first portion of the drivetrain 24 may include gears provided along a side edge 98 of the main wall 90 and these gears may rotate about one or more axes that are parallel to the motor axis 54. A second portion of the drivetrain 24 may include gears located adjacent to one or both sides 92, 94 of the main wall 90 of the mounting frame 60, and these gears may rotate about one or more axes that are at a different angle than the gears of the first portion, which angle may be 90 degrees as shown in the illustrated example.

Figure 5:
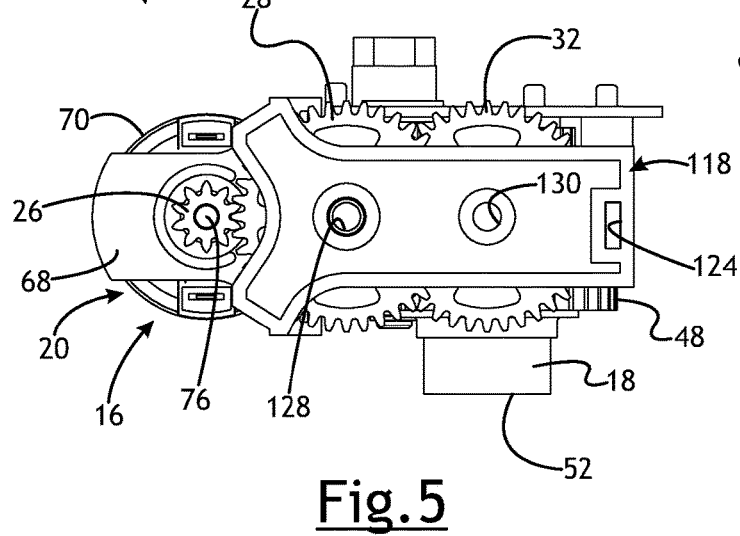
FIG. 5 is a rear view of the actuator assembly.

The first portion of the drivetrain 24 may have a height, measured in the direction perpendicular to the axes of rotation, that is not greater than 15% larger than the corresponding dimension of the motor casing 70 (e.g. the diameter of the casing), and which may be equal to or smaller than the corresponding dimension of the motor casing 70. The height of the first portion of the drivetrain 24 may be within 15% of the height of the second portion of the drivetrain, including the gears thereof, but not necessarily the output 18, which may extend from the ninth gear 48 so that it extends through or is accessible in an opening 198 in the housing 19. The opening 198, in at least some implementations, may be formed in the housing base 190 spaced from the outer edge or sidewall 200 of the base 190, as shown in FIG. 13. The mounting frame 60 may have portions that extend beyond the drivetrain gears in height (e.g. to engage the cover 188 and base 190 of the housing 19), width (perpendicular to height, parallel to the motor axis 54) and depth (perpendicular to height and perpendicular to the motor axis 54). As shown in FIG. 5, for example, the lateral wall 78 of the motor supporting portion 62 may have a height that is greater than the height of the first portion of the drivetrain 24 which is adjacent to the lateral wall 78.

Further, with regard to the height, the mounting frame 60 may include an electronics supporting portion 66 that may include one or more posts 202a, b, c. The posts 202 may be cantilevered to the main wall 90 and extend to free ends 204 that are spaced from the main wall 90. The posts 202 may have a height greater than the height of the adjacent gears and the circuit board 162 may be mounted to the free ends 204 of the posts 202 so that the circuit board overlies a least part of the drivetrain 24 and main wall 90, that is, the circuit board 162 is spaced from the drivetrain supporting portion 64 of the frame 60. In the example shown, the circuit board 162 is received over the fifth and sixth gears 36, 42, and may overlap part of the seventh gear 44 but includes a cutout or is otherwise formed to avoid overlapping the drive feature 184 that extends axially from the seventh gear 44. In this way, the circuit board 162 is received between the housing 19 and the main wall 90, and also between the housing 19 and at least one gear of the drivetrain 24. The circuit board 162 could instead overlap the eighth gear 46 and part of the ninth gear 48 (without blocking the output 18), or be located along a side edge of the main wall 90, along the outer side of the gear retainer 118, along an outside of the motor 20, or elsewhere, as desired. The circuit board can include opposite first and second surfaces 205, 207 (FIG. 6) to which electrical components are mounted, and these surfaces may be arranged generally parallel to the motor axis 54 and perpendicular to the output axis 37. An electrical connector or connector pins 206 (FIGS. 2 and 6) may be coupled to the circuit board 162 and the housing 19 may include an electrical connector opening 208 through which the electrical connector extends, and/or the housing may include an electrical connector 209 having openings in which the pins 206 are received in assembly. It is recognized that there are various ways to pass wires or pins from outside of the housing 19 to the circuit board 162 that is within the housing.

A first post 202a may be located close to a side edge of the main wall 90 to position the circuit board 162 close to that edge which, in assembly, is adjacent to the connector or connector opening 208 in the housing 19. A second post 202b may be located spaced from the first post 202a and proximal to an opposite side of the main wall 90 and frame 60, and one or more gears may be carried by the main wall 90 between the posts 202a, b, and the circuit board 162 may span the distance between the posts. As noted above with regard to sensing the rotary position of the output 18, the circuit board 162 may include a sensor 160 generally axially aligned with the output 18. The lateral walls 78, 82 and or other flanges of the mounting frame 60 may extend to the same or greater height than the free ends 204 of the posts 202a, b, c, and the posts may extend higher than the circuit board 162 (e.g. through openings 210 in the circuit board 162) to support the housing 19 spaced from the circuit board 162, as well as from the first drivetrain portion (e.g. gears one through four). Similar walls or flanges may extend from the main wall 90 in the opposite direction to support the housing 19 spaced from the eighth and ninth gears 46, 48, as well as from the first drivetrain portion.

As disclosed herein, the drive gear 26 may be a simple gear, like a spur gear. As such, the combined drive gear and drive member, including the motor and its drive shaft, can be of minimal axial length and much shorter than other actuator assemblies that utilize a worm gear as the drive gear (i.e. the gear that is directly driven by the motor). The worm gear in such assemblies extends axially from the motor drive shaft a greater distance than does the spur gear, and often a distance equal to or longer than the motor itself. In the example shown herein with a small spur gear as the drive gear 26, the axial extent of the spur gear may be less than 15 mm or less than 25% of the axial extent of the motor casing. This may further provide an actuator assembly that is less than 25% greater in axial length or extent than the motor casing.

Beyond the first and second portions of the drivetrain, in at least some implementations, all gears in the drivetrain may be situated within a space that is less than 15% greater than the axial length of the motor and drive shaft, and less than 15% greater than the height of the motor (which is the outer diameter of the motor casing 70). Thus, in at least two dimensions, the size of the actuator assembly is not much bigger than what is required for the drive member 16 itself. A third or width dimension of the actuator assembly, perpendicular to the height and length just noted, may be within 25% of the length of the motor and drive shaft. Thus, the motor and drivetrain may both be within a rectangular prism of the noted dimensional parameters stated as functions of the length and height of the motor. The mounting frame 60 may also be received within the prism defined herein to provide a compact actuator assembly.

The circuit board 162, controller 22 and/or the rotation sensor 160 may also be received within the prism defined above to provide a feature inclusive yet compact actuator assembly. It may be advantageous in some implementations to include the electronics module (e.g. circuit board 162 and related components and circuitry) affixed or otherwise integrated into the actuator assembly 10 to, for example, reduce the overall number of parts, reduce complexity, and more accurately sense and control the operation of the motor 20 and the output 18. However, the electronics may generate heat and/or be subjected to heat from the transmission when located close to the transmission, and excessive heat could negatively affect the electronics. In at least some implementations, the circuit board 162, controller 22 and/or rotation sensor 160 are positioned on an opposite site of the actuator assembly 10 as the output 18. In at least some implementations, the main wall 90 or another wall of the mounting frame 60 extends between the output 18 and the circuit board 162, with a pin 134 or shaft of the output 18 and ninth gear 48 extending through an opening 138 in the main wall 90. Likewise, other than the opening 198, the wall of the housing base 190 is also arranged between the circuit board 162 and the transmission, as are one or more gears. In this way, as noted above, the magnet 164 can be arranged to rotate about the same axis 37 as the output 18 but is spaced from the output by the intervening pin 134, and hence, is spaced from the transmission farther than the outer end 52 of the output 18. In at least some implementations, the controller or microprocessor 22 may be remotely located (i.e. not contained within the interior of the housing 19) from the assembly 10 and communicated therewith by suitable wires or wirelessly, as desired.

Further, worm gears are generally of lower efficiency than other types of gears, like a spur gear, and like the bevel, hypoid, face or crown gears that may be used to provide a direction change in the assembly, as noted above. The more efficient gears used in the actuator assembly 10 enable use of a less powerful motor 20, which may thus be smaller than motors used in prior assemblies. The less powerful and smaller motor 20 may be less expensive and also weigh less which facilitates vehicle weight reduction and reduced fuel consumption. These features also further enable the actuator assembly 10 to be compact so that it may be more readily located on a transmission or in other small spaces. Further, the motor may be a brushed DC motor and still be of relatively small size and provide the necessary torque to drive the drivetrain. Typically, brushless motors may be smaller than brushed motors of similar output torque, but brushless motors are more expensive and require a more costly and complex controller to operate them. Accordingly, while brushless motors may be used, if desired, the drivetrain 24 may be arranged to permit use of a small, brushed motor 20 to reduce the cost and complexity of the assembly. In at least some implementations, the motor provides an output torque to the drive shaft 76 of not greater than 0.5 Nm (nominal, e.g. at room temperature and with 12 VDC input), has a maximum axial length of the casing and drive shaft of 80 mm and a casing outer diameter not greater than 50 mm. In one example, a motor was used that has an axial length of the casing and drive shaft of 67 mm, and a casing with an outer diameter of 30 mm.

Still further, worm gears are generally not backdrivable and are generally self-locking means that they cannot be rotated, or cannot be rotated efficiently or without great effort, by rotating a gear or other portion of the drivetrain downstream of the worm gear (where the motor is upstream of the worm gear). As noted above with regard to the drive feature 184, there are instances in which the drivetrain may need to be manually rotated in either direction (forward and reverse) to cause a transmission gear shift. This may be desired, for example, when power to the motor is interrupted or lost, or when the motor fails. In at least some implementations, the drivetrain does not include a worm gear, and no worm gear exists in the torque flow path between the motor and the output. In at least some implementations, the efficiency of the drivetrain is the same or within 10% of the same in either direction of rotation.

Further, even if backdrivable gears are used, a connection to the drivetrain 24 at the motor drive shaft 76 or drive gear 26 to effect a manual gear shift by manually rotating the drivetrain with a tool would require a high number of revolutions, e.g. tens or hundreds of revolutions, to effect a gear change due to the gear ratios in the drivetrain as noted above. Alternatively, if the connection to the drivetrain 24 to effect the manual gear shift were made directly to the output 18, a very high torque would be required, such as greater than 10 Nm which is beyond the range of torque most people can generate with a hand tool like a screwdriver or small wrench. A larger tool may not fit within the space needed, and larger tools and power tools are not as readily available to people needing to shift the vehicle transmission manually, e.g. in an emergency situation.

In at least some implementations, the drive feature 184 for manually rotating the drivetrain 24 and output 18 to cause a transmission gear shift is provided between the first and last gear stages having a torque increase (which also provides a speed reduction). In at least some implementations, the drivetrain 24 may have a first portion providing a speed reducing gear ratio, a second portion including a drive feature 184 for rotation of the drivetrain independently of the motor 20 and a third portion providing a speed reducing gear ratio, and the second portion is between the first and third portions in the drivetrain. That is, the first portion is between the motor 20 and the second portion, and the third portion is between the second portion and the output 18. The first portion of the drivetrain 24 and the third portion of the drivetrain may provide a torque increase of at least 2:1, in some implementations one or both of the first and third portions provide a torque increase of at least 4:1 and in some implementations one or both of the first and third portions provide a torque increase of at least 10:1. In at least some implementations, the torque required to rotate the drive feature 184 is 6 Nm or less, such as between 3 and 6 Nm. In at least some implementations, the number of rotations of the drive feature 184 that are needed to shift a transmission between park and neutral is between ¼ and 1 rotation, and in some instances less than ¾ of a rotation.

The drive feature 184 may face in a different direction than the output 18. In the example shown in the drawings, the drive feature 184 faces in the opposite direction as the output 18. When the actuator assembly 10 is mounted directly to the transmission, the output 18 faces and is coupled to the transmission so having the drive feature 184 face the same direction would require getting a tool between the actuator assembly 10 and the transmission which would not be practical, in at least some implementations. Having the drive feature 184 face oppositely to the output means that the drive feature is accessible from the other side of the actuator assembly 10 as the output 18, and thus, the transmission is generally not in the way of accessing the drive feature. This also permits rotation of the drive feature 184 about an axis 45 that is parallel to the output axis 37 such that a direction change is not needed between the drive feature 184 and the output 18. In the example shown wherein the housing 19 includes a cover 188 and a base 190, the drive feature 184 may extend through or be accessible via the opening 186 in the cover and the output 18 may extend through or be accessible via the opening 198 in the base 190 which may be formed in an opposite side of the housing as the opening 186 in the cover 188. Having the drive feature 184 face perpendicular to the output 18, or at some other angle not parallel to the output axis 37, may require a direction changing gear between the drive feature and the output, which can be more expensive and less efficient (e.g. there might be greater friction in direction changing gears). While not ideal in some implementations, having the drive feature 184 face the same direction or a non-parallel direction to the output 18 is possible and may be used in accordance with this disclosure, as desired.

Figure 1:
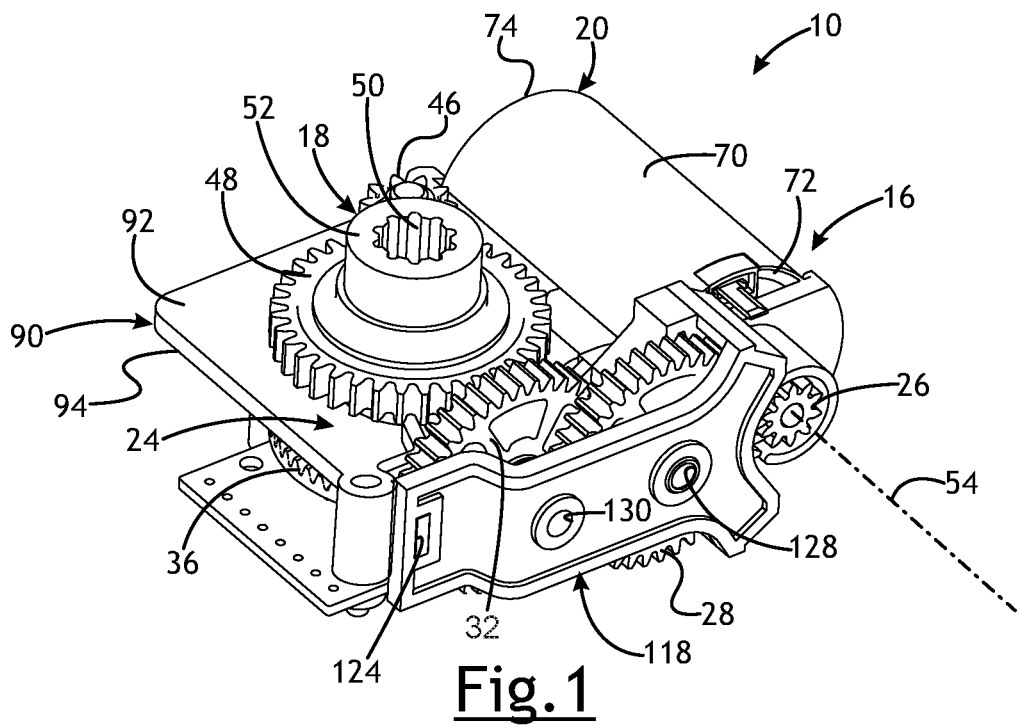
FIG. 1 is a perspective top view of a shift actuator assembly including a motor and an output, with a drivetrain between the motor and output and carried by a mounting frame.
Figure 2:
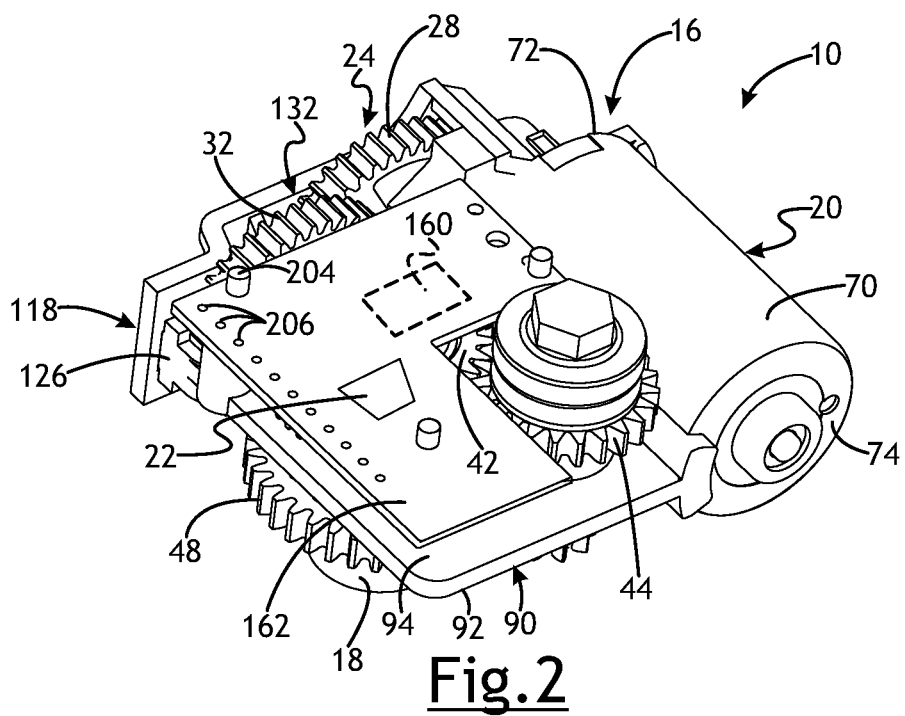
FIG. 2 is a perspective bottom view of the actuator assembly.
Figure 3:
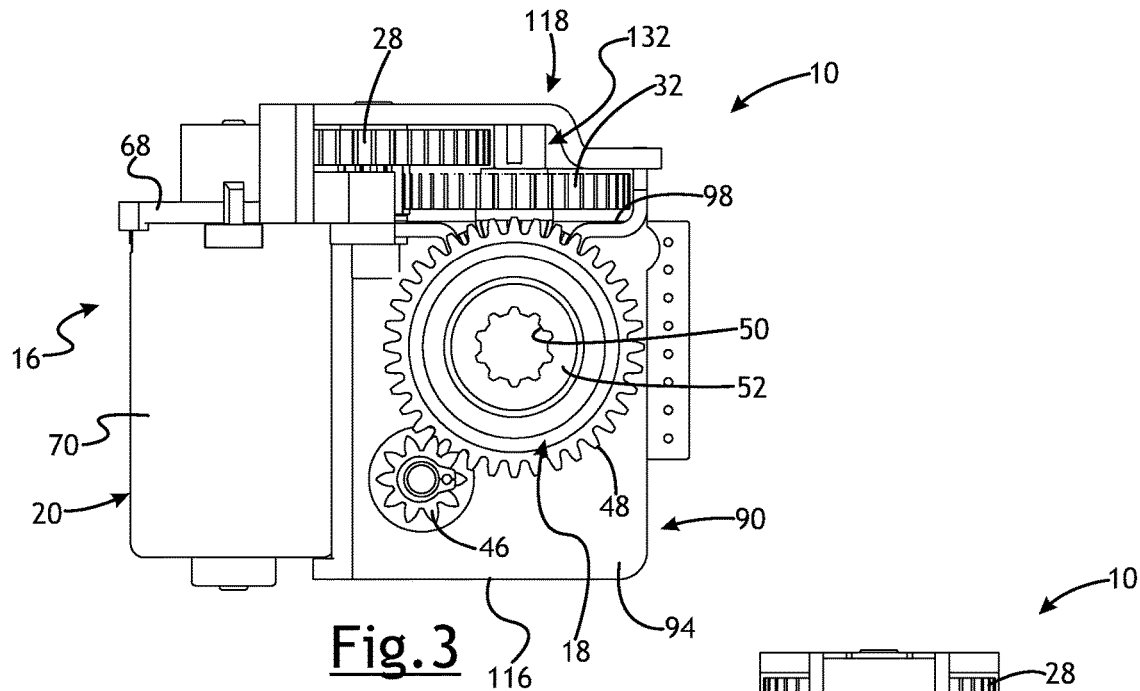
FIG. 3 is a top view of the actuator assembly.
Figure 4:
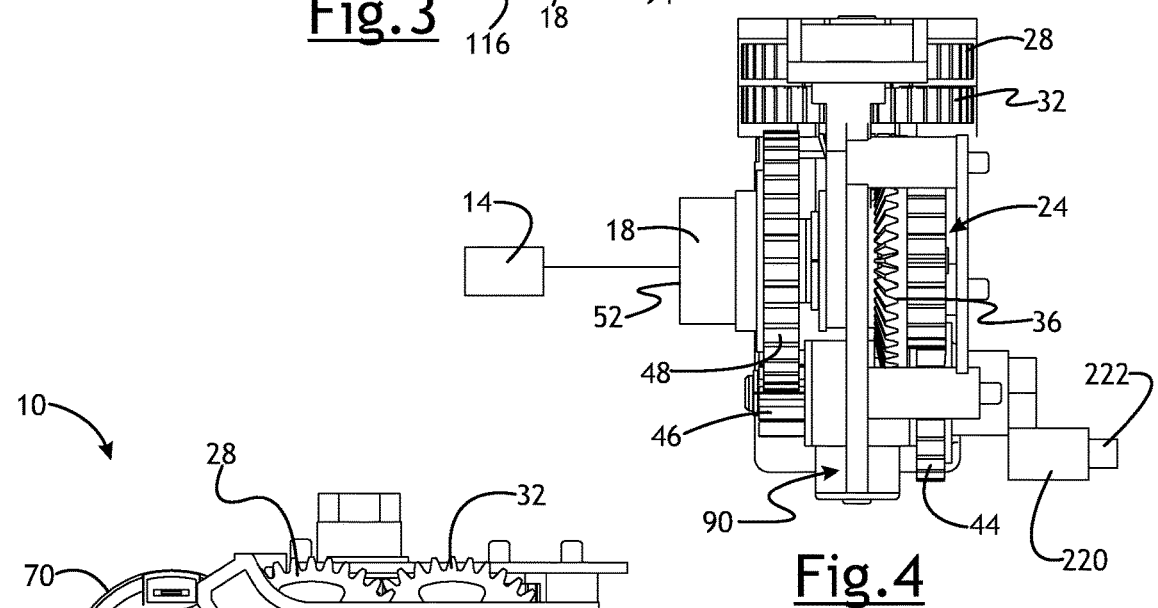
FIG. 4 is a side view of the actuator assembly.

As diagrammatically shown in FIG. 4, an actuator 220 may be coupled to the drive feature 184 or may comprise the drive feature and may be rotatable about the axis of the drive feature to rotate the drivetrain 24. The actuator 220 may be a component to increase the torque that may be applied to rotate the drivetrain 24, such as a lever, handle, knob having a larger diameter or the like. The actuator 220 may include a coupling feature 222 (ball stud, fastener, clamp, press-fit feature or the like) to permit a cable, linkage or other force transmission feature to be coupled to the actuator 220 to facilitate remotely driving the actuator. In one non-limiting example, a cable could lead into the vehicle passenger compartment or an engine compartment (e.g. under a vehicle hood) and be coupled at its send end to a remote actuator (e.g. handle or lever) that is manipulated from within the passenger compartment or engine compartment to provide a mechanism by which the drive feature 184 can be rotated without having to have direct access to the housing 19 and actuator assembly 10.

In the example shown, the drive feature 184 is coupled to the seventh and eighth gears 44, 46, which rotate together and are on opposite sides of the main wall 90 from each other. Rotation of the drive feature 184 in a first direction rotates the seventh and eighth gears 44, 46 in that direction and rotates the ninth gear 48, and the output 18 which is integral with or fixed to the ninth gear, in a second direction. The eighth gear 46 may comprise a pinion gear which may be in the form of a simple spur gear.

As noted herein, the actuator assembly 10 may be compact, lightweight and include many features. Further, the actuator assembly 10 may be easier to assembly than prior assemblies which included drivetrain mounting features integral with an outer housing of the assembly. Such prior assemblies require assembly in one direction, i.e. starting with the bottom components and building upwardly from them. The actuator assembly 10 herein, with the mounting frame 60 that is at least partially between certain of the gears, enables assembly in two or more directions, including from opposite sides of the main wall 90, as well as about the side edges (e.g. 98) of the main wall. Further, a plurality of gear stages may be retained in place relative to the mounting frame 60 with just a few retainers (i.e. gear retainer 118, and clip retainers 154, 182).

While the forms of the invention herein disclosed constitute presently preferred embodiments, many others are possible. It is not intended herein to mention all the possible equivalent forms or ramifications of the invention. For example, while one example of a drivetrain 24 was shown, others may be used, for example without limitation, a planetary gear set or a drive train that includes linkages, gears a combination thereof, or other drive members. It is understood that the terms used herein are merely descriptive, rather than limiting, and that various changes may be made without departing from the spirit or scope of the invention.

The invention claimed is:

1. A gear shift actuator assembly to cause gear changes in a vehicle transmission, comprising:

a drive member that is electrically operated;

a drivetrain driven by the drive member and having a plurality of gears arranged in a plurality of stages to provide a torque increase and a direction change within the drivetrain;

an output driven by the drivetrain for rotation to cause a gear change in the vehicle transmission, wherein a first portion of the drivetrain is between the drive member and a second portion of the drivetrain that includes the direction change, and the first portion of the drivetrain provides a torque increase of at least 2:1 and the second portion of the drivetrain provides a torque increase of at least 2:1, and wherein the second portion of the drivetrain is coupled to a third portion of the drivetrain that is between the second portion of the drivetrain and the output, and wherein the third portion of the drivetrain provides a torque increase of at least 2:1, and wherein the direction change is provided by one gear of the plurality of gears that rotates about a first axis and another gear of the plurality of gears that rotates about a second axis that is not parallel to the first axis, and said another gear is meshed with said one gear and said one gear is one of a bevel gear, face gear, crown gear or hypoid gear; and wherein said another gear and the output are coaxial.

2. The assembly of claim 1 wherein the first axis and second axis are perpendicular to each other.

3. The assembly of claim 1 wherein the output rotates about an axis parallel to the second axis.

4. The assembly of claim 1 which also includes a mounting frame to which at least some of the drivetrain gears are coupled, and wherein the mounting frame has a wall with a first side and a second side opposite to the first side, and the output is on the first side of the wall and said another gear is on the second side of the wall.

5. The assembly of claim 1 wherein the drive member includes a drive shaft and a motor that rotates the drive shaft, and the drivetrain includes a drive gear coupled to the drive shaft wherein the drive gear is a spur gear.

6. The assembly of claim 1 wherein the drive member includes a drive shaft and a motor that rotates the drive shaft about a first axis, and wherein the drivetrain includes a drive gear coupled to the drive shaft, and wherein a first gear of the plurality of gears is meshed with and driven by the drive gear for rotation about a second axis offset from and parallel to the first axis, and a second gear of the plurality of gears is meshed with and driven by the first gear, and wherein the second gear is located within the axial extent of the drive member measured along the first axis.

7. The assembly of claim 1 wherein the gears of the drivetrain may be driven in opposite directions.

8. The assembly of claim 1 wherein the drive member includes a casing, the plurality of gears includes a drive gear driven by the drive member, and all gears in the drivetrain are disposed within an axial dimension defined by the surface of drive gear farthest from the casing and an end of the casing farthest from the drive gear.

9. The assembly of claim 1 wherein the plurality of gears includes a first gear that is meshed with the drive gear, a second gear that co-rotates with the first gear, and a third gear that is meshed with the second gear, wherein the first gear and second gear have a common axis of rotation that is parallel to the first axis, and the drive gear and first gear are axially outboard of the second gear and third gear.

10. The assembly of claim 9 wherein the first gear has more teeth than the drive gear, the second gear has fewer teeth than the first gear, and the third gear has more teeth than the second gear.

11. The assembly of claim 9 which also includes a fourth gear that co-rotates with the third gear and defines said one gear of the plurality of gears that rotates about the first axis, and a fifth gear that is meshed with the fourth gear and rotates about an axis perpendicular to the axis of rotation of the third gear and defines said another gear of the plurality of gears that rotates about a second axis that is not parallel to the first axis.

12. A gear shift actuator assembly to cause gear changes in a vehicle transmission, comprising:

an electric motor having a casing and a drive shaft driven by the motor for rotation about a first axis;

a drivetrain including a drive gear mounted on and driven by the drive shaft for rotation about the first axis, where the drive gear is a spur gear, and where the drivetrain also includes a plurality of gears that are rotated as the drive gear rotates, the plurality of gears providing a torque increase within the drivetrain; and an output driven by the drivetrain for rotation and being connectable to a vehicle transmission to cause a gear change in the vehicle transmission, wherein all gears in the drivetrain are disposed within an axial dimension defined by the surface of the drive gear farthest from the casing and an end of the casing farthest from the drive gear;

wherein the plurality of gears includes a first gear that is meshed with the drive gear, a second gear that co-rotates with the first gear, and a third gear that is meshed with the second gear, wherein the first gear and second gear have a common axis of rotation that is parallel to the first axis, and the drive gear and first gear are axially outboard of the second gear and third gear; and wherein the assembly further includes a fourth gear that co-rotates with the third gear, and a fifth gear that is meshed with the fourth gear and rotates about an axis perpendicular to the axis of rotation of the third gear.

13. The assembly of claim 12 wherein at least two of the gears in the drivetrain are meshed together and rotate about axes that are not parallel.

14. The assembly of claim 13 wherein said at least two of the gears are of one of the following types of gears: bevel, face, crown or hypoid.

15. The assembly of claim 13 wherein at least two gears are located between the drive gear and said at least two of the gears that rotate about axes that are not parallel, and said at least two gears provide a torque increase of at least 5:1.

16. The assembly of claim 12 wherein the first gear has more teeth than the drive gear, the second gear has fewer teeth than the first gear, and the third gear has more teeth than the second gear.

17. The assembly of claim 12 wherein the fourth gear has fewer teeth than the third gear.

18. The assembly of claim 12 wherein the third gear has an axis of rotation that is spaced from and parallel to the axis of rotation of the first gear and second gear, and the fourth gear that co-rotates with the third gear and has fewer teeth than the third gear, and which also includes a fifth gear that is meshed with the fourth gear and rotates about an axis perpendicular to the axis of rotation of the third gear.

19. The assembly of claim 12 wherein the fourth gear and fifth gear are offset from the casing and located within a height of the casing, where the height is perpendicular to the first axis.

20. The assembly of claim 12 wherein all gears in the drivetrain are disposed in an area having a height less than 15% greater than a height of the casing, where the height is perpendicular to the first axis.

21. The assembly of claim 12 wherein the third gear has an axis of rotation that is spaced from and parallel to the axis of rotation of the first gear and second gear, and the fourth gear that co-rotates with the third gear and has fewer teeth than the third gear, and which also includes a fifth gear that is meshed with the fourth gear and rotates about an axis perpendicular to the axis of rotation of the third gear.

22. The assembly of claim 12 wherein the fourth gear and fifth gear are offset from the casing and located within a height of the casing, where the height is perpendicular to the first axis.

* * * * *